Aug. 12, 1941.  W. B. HARRIS  2,252,344
DOBBY CHAIN
Filed Sept. 20, 1940

Inventor
Warren B. Harris
By Clayton L. Jenks
Attorney

Witness
Herbert E. Covey

Patented Aug. 12, 1941

2,252,344

UNITED STATES PATENT OFFICE 2,252,344

DOBBY CHAIN

Warren B. Harris, Millbury, Mass.

Application September 20, 1940, Serial No. 357,587

2 Claims. (Cl. 139—333)

This invention relates to dobby chains which are used in looms for controlling the pattern of the cloth.

In my Patent No. 2,190,837 of February 20, 1940, I have shown a chain in which the bar is made of a resinoid and in which the bars are connected together by means of eyelets made of wire bent to shape and molded into the bar. These metal eyelets are expensive to shape, and problems are presented in the matter of assembling them in the mold and forming the completed article.

I have now found that the entire bar and its eyelets may be made of a single piece of resinoid, and that the parts may be so shaped and arranged that they may be connected together by a simple metal link passing through a hole in the bar.

The primary object of this invention is, therefore, to make a simplified and economical form of dobby chain and to provide a structure which will give a long life of useful service. Further objects will be apparent in the following disclosure.

Referring to the drawing, which illustrates a preferred embodiment of my invention:

In accordance with this invention, I have provided a dobby chain in which the crossbars 10 are made of a plastic material, such as plasticized cellulose acetate, sold on the market under the trade name of "Tenite," which is a moldable material capable of being molded to a desired shape by means of heat and pressure. This substance is sufficiently plastic in its final form to permit of its use with a screw threaded dobby peg, and the peg may be directly screwed into a smooth surfaced hole and thus form its own holding thread.

Figure 2:
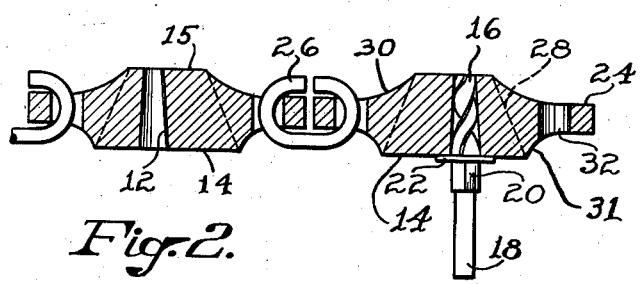
Fig. 2 is a section on the line 2—2 of Fig. 1.
Figure 3:
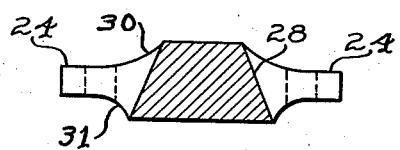
Fig. 3 is a section on the line 3—3 of Fig. 1.

The bars are preferably wedge shaped, so that the face 14 on the side from which the peg projects is wider than the other side 15. The dobby peg holes 12 are formed in the bar during the molding operation, and they are suitably shaped and arranged as required for use with the various types of dobby pegs. I prefer to employ a dobby peg of the type shown in the drawing which has a screw threaded portion adapted to be threaded into the hole in the bar. The hole and the peg are preferably slightly tapered, such as about 0.008 inch. The preferred peg, as shown in Fig. 2, is a metal pin having a coarse thread 16 thereon and a substantially cylindrical end 18. A squared portion 20 serves for the application of a wrench to force the peg into position in the bar. A flange 22 limits the inward movement of the peg and therefore locates it relative to the bar.

In the preferred construction, the bar is initially shaped in the mold so that the peg holes are smooth walled and tapering in the direction of taper of the bar. That is, the holes are shaped as frustums of cones; and they are slightly undersize, as compared with the tapered threads of the pegs, so that the threads of the pegs may serve as dies and cut a corresponding thread in the plastic material of the bar. The peg holes are suitably arranged as required for the weaving operation, such as in a single row or as two rows of staggered holes extending lengthwise of the bar. These holes are so arranged that the pegs may be suitably located to govern the pattern to be woven. If desired, I may use strong resinoids of the type of the "Bakelite" phenolformaldehyde condensation product and cut the threads in the bar by means of self-tapping screws; or the resinoid may be modified with plasticizers, wood flour, etc. so that a screw threaded peg may be used. I prefer to employ cellulose acetate plasticized with tricresyl phosphate or other standard high boiling solvent or plasticizing material which makes a slightly plastic yet strong substance capable of being used with the threaded dobby peg of the type illustrated.

Figure 1:
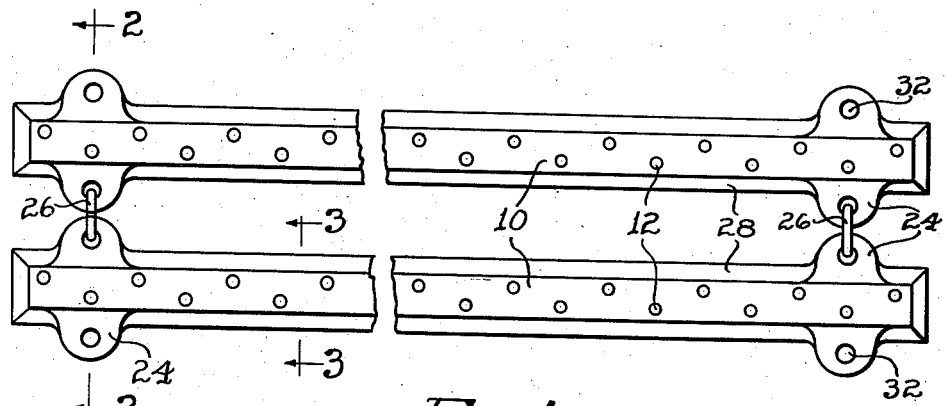
Fig. 1 is a plan view of two connected bars, partly broken away.

A primary feature of this invention relates to the special shape of the bar which permits it to be fastened by metal links to the adjacent bars. To this end, I provide each bar near its opposite ends with two pairs of lugs which are formed integral with the bar during the molding operation. Each lug projects laterally from the bar to a sufficient distance as required for a proper spacing of the bars of the dobby chain, and each is shaped in such a manner that the bars may be connected by a simple metal wire link 26. While the lug may be made in various shapes, it is preferred to shape it as shown in the drawing. The bar is customarily provided with tapering side walls 28, and these walls merge with the side walls 30 and 31 of the lug. This shape is such that the entire bar with its securing lugs may be formed in a two part mold and readily removed therefrom. The lug is narrower than the thickness of the bar, so that the wire links 26 may lie wholly within the planes of the two opposite flat sides 14 and 15 of the bar. Hence, the link 26 will not interfere with the proper operation of the dobby chain. The lugs are shaped to give a required strength. For example, the bar may be 8 inches long and tapering from a width of $\tfrac{9}{16}$ inch to $\tfrac{5}{16}$ inch, and the lug may be about $\tfrac{3}{8}$ inch high and have tapering sides, as shown. Each of the lugs is provided with a hole 32 within which the link 26 is secured. This hole is preferably cylindrical in shape and is formed during the molding operation. These holes are formed by means of correspondingly shaped cores suitably mounted in the mold. Since the lugs are made of the same material as constitutes the remainder of the dobby chain bar, there is nothing to interfere with positioning the dobby pegs wherever desired. As shown in Fig. 1, one of these dobby peg holes may be directly in line with the adjacent holes 32 and links 26 in the lugs.

It will now be appreciated that since the bar is made of a molded material and all of the holes may be formed therein during the single operation, there will be no further effort or expense required for drilling the holes or forming an eyelet, and there will be no serious problem involved in connecting the bars together by the metal links. The absence of any wire or other metal inserts in the bar makes it possible to place the dobby peg holes wherever desired and the bar is not weakened by the presence of metal inserts. The bar and its securing lugs are not affected by moisture as are the wooden parts heretofore used, and the resinoid bar will give a far longer life of useful service than does the standard wooden bar. The lug 24 may be made as large as needed for strength, and the link 26 may be shaped as desired to give a required security of fastening and to minimize the wear on the parts. This is a distinct advantage over a wire or stamped metal insert embedded in the bar. Various other advantages will be apparent in this construction.

It is to be understood that many modifications may be made in the shape and arrangement of the parts, and that the above description is to be considered as illustrative of the general principles of the invention and not as limiting the scope of the claims appended hereto.

What I claim as my invention and desire to secure by Letters Patent is:

1. A dobby chain comprising a set of crossbars made of a molded material and having a series of spaced dobby peg holes formed therein, each bar having integral therewith and adjacent its opposite ends a pair of opposed lugs which are provided with perforations therethrough, metal links inserted in said perforations which connect the bars as a chain, each lug being made of said molded material and integral with the bar and being narrower than the thickness of the bar so that the links inserted therein may lie within the planes of the outer faces of the crossbars and the parts being shaped and arranged for molding the bar in a single operation.

2. A dobby chain comprising a set of crossbars made of a molded material which have tapered dobby peg holes formed therein, each bar having integral therewith a pair of lugs adjacent each of its ends and on opposite sides thereof, each lug having a hole therein, and links passing through the opposed holes of adjacent bars and connecting the same, said lugs being thinner than the bar and so shaped that the links lie wholly within the two planes passing through the opposite sides of the adjacent bars, said bar and lugs being made of a plastic material capable of having a thread formed therein by the screw thread of a dobby peg and the parts being shaped and arranged for molding the bar in a single operation.

WARREN B. HARRIS.